United States Patent [19]

Birnbaum

[11] Patent Number: 4,522,069
[45] Date of Patent: Jun. 11, 1985

[54] WINDVANE

[76] Inventor: Samuel Birnbaum, 11 Shadow Grove La., Holbrook, N.Y. 11741

[21] Appl. No.: 224,460

[22] Filed: Jan. 12, 1981

[51] Int. Cl.[3] .............................................. G01P 13/02
[52] U.S. Cl. .................................. 73/188; 116/28 R; 116/265
[58] Field of Search ............... 73/188, 189; 116/28 R, 116/26, 200, DIG. 7, 265; 350/96.19, 96.10

[56] References Cited

U.S. PATENT DOCUMENTS

| 2,328,485 | 8/1943 | Ott ........................................ 116/288 |
| 2,782,544 | 2/1957 | Tobin ................................. 350/96.1 |
| 3,354,715 | 11/1967 | Causey .................................. 73/188 |
| 3,371,529 | 3/1968 | Tillman ................................. 73/188 |
| 4,068,121 | 1/1978 | Bringhurst ....................... 350/96.19 |
| 4,300,470 | 11/1981 | Furukawa .......................... 116/288 |

FOREIGN PATENT DOCUMENTS 2015161 9/1979 United Kingdom ................ 116/288

Primary Examiner—Charles Frankfort
Assistant Examiner—Denis E. Corr
Attorney, Agent, or Firm—Bauer & Amer

[57] ABSTRACT

A plexiglass or similar plastic windvane that has beveled peripheral edges or is otherwise provided with surface markings from which light rays impinging thereon exit from the plexiglass causing illumination of the edges or markings, whereby the windvane is effectively used at night or under conditions of diminished visibility to designate wind direction.

2 Claims, 5 Drawing Figures

WINDVANE

The present invention relates generally to an improved windvane wherein, more particularly, the improvements reside in the manner in which the windvane is illuminated for night-time use.

In circumstances where a high voltage battery or line current is not available to power a spotlight illuminating the windvane, other techniques are required to provide visibility of the windvane without which, of course, the wind direction cannot be readily observed. One such substituted technique is exemplified by the windvane of U.S. Pat. No. 1,942,039, and calls for a light to rotate with the windvane and thus to project a light beam in the pointing direction thereof. While this prior art windvane provides a readily perceived visual indication of wind direction, the electrical energizing of the rotating light requires commutator-type contacts or a similar electrical component to transmit the electricity to the rotating light from the non-rotating or stationary battery. This type of electrical component is vulnerable to short circuit or other malfunctioning, and thus in this and other respects improvements are required in prior art illuminated windvanes.

Broadly, it is an object of the present invention to provide a simply constructed and operating windvane for night-time use overcoming the foregoing and other shortcomings of the prior art. Specifically, it is an object to obviate rotation of both the battery and of the windvane-illuminating light, thus significantly simplifying the electrical connection therebetween, as well as achieving other noteworthy features in an illuminated windvane.

A windvane demonstrating objects and advantages of the present invention is of the type adapted to be illuminated at night incident to indicating wind direction. Such windvane consists of the combination of an upright support defining a vertically oriented rotation axis and a windvane having a flat body of plastic construction material, such as plexiglass, rotatably mounted adjacent the top of the upright support. An illumination source, such as a battery-operated light, is advantageously located to radiate light rays throughout the windvane flat body. That is, the illumination source is disposed on the rotation axis and projects into an internal opening of the body and also said light is operationally stationary in relation to the rotating windvane body. For illumination, the peripheral edge of the windvane is beveled, and thus the light rays exiting from the windvane through the beveled edge "light up" or illuminate such edge in much the same way that scratches and etched markings in plexiglass or the like are illuminated. In this way, the illuminated edge functions as a visual indication of the direction of the wind that is providing the position of rotation to said windvane.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a front elevational view of a prior art windvane capable of use at night or during times of diminished visibility;

The remaining figures illustrate an improved windvane according to the present invention which during night-time use has significant advantages over presently known windvanes, all as will be described in detail subsequently herein. More particularly, FIG. 2 illustrates a preferred embodiment for the within improved windvane atop of a mast of a sailboat;

Figure 1:
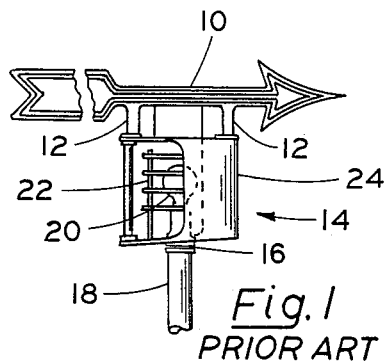

As background, reference should be made to a typical prior art windvane illustrated in FIG. 1 which is specifically structurally adapted to be used at night or during periods of diminished visibility. The component which points out the direction of the wind or the vane per se, designated 10, is mounted on post 12 on top of a light bulb housing 14 which in turn is mounted for rotation, as by a ball-bearing 16, on top of a tall post or pole 18. To indicate wind direction at night, the light bulb 20 is illuminated and the light rays therefrom are reflected by reflector 22 as a beam of light (not shown) out through a transparent wall 24 of the housing 14. In this manner, the projected light beam assumes the same pointing direction as the vane 10 and is thus capable of indicating to an observer the direction of the wind at night or under conditions of diminished visibility.

Exemplifying the typical FIG. 1 illuminated windvane is the windvane described and illustrated in U.S. Pat. No. 1,942,039. While these illuminated windvanes generally achieve their objective in providing a means for determining the wind direction at night, there are some shortcomings and difficulties associated with the construction and operation thereof. As but one illustration of a shortcoming, it is to be noted that since the prior art light rotates with the windvane, that the electricity for illuminating the light or illumination source must be transmitted through a ball-bearing or other such component, and is thus vulnerable to a short circuit or other such malfunction.

In contrast to the foregoing, the within improved windvane, among other noteworthy features, uses a stationary illumination source and thus does not require transmission of electricity through commutators or similar switching which must allow for relative movement between the light bulb being illuminated and the battery supplying the electricity. The manner in which electrical components that are subject to malfunctioning are eliminated in the within improved windvane, and other noteworthy aspects thereof, will be more readily appreciated as the description proceeds.

Figure 2:
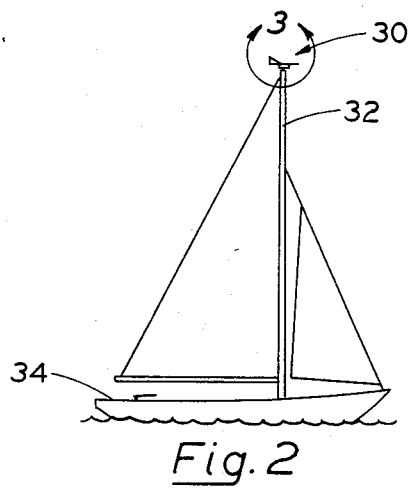

The within improved windvane being capable of use not only during the day but also at night under conditions of diminished visibility is particularly useful on a sailboat for night sailing and thus will be described in reference to this particular end use. However, it will be understood that the windvane can also be used at airports and at other locations where it is useful to know the direction of the wind. In the context of its use on a sailboat, and as illustrated in FIG. 2, the within improved windvane, generally designated 30, will be understood to be rotatably mounted on top of the sailboat mast 32. Such position for the windvane 30 is of course necessary so that nothing impedes its rotation, and thus prevents it from accurately determining the direction of the wind. However, the remote location for the windvane 30 atop the mast 32 complicates it being readily visually perceived by an observer in the hull 34 of the sailboat. Further complicating the problem is that the windvane 30 cannot be illuminated by a spotlight or the like requiring extensive electricity. Rather, the illumination by which the windvane 30 is visually perceived must be achieved using a 12 volt or possibly even only a 6 volt battery. There is no particular problem, however, in maintaining the battery in the hull 34 and electrically connecting said battery, by wiring or electrical conductors extended along the mast 32, to the light bulb which is used as the illumination source for the windvane 30. Since the referred to electrical connection between the battery and light source is conventional, the description thereof is not necessary and has therefore been omitted for brevity's sake.

Figure 3:
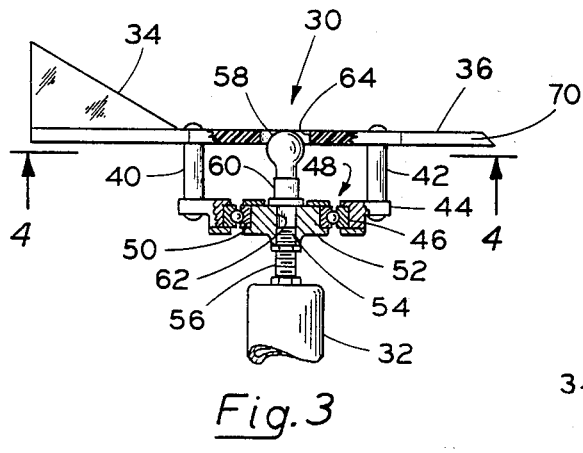
FIG. 3 is a partial front elevational view, on an enlarged scale, with some portions broken away illustrating detailed structural features of the within improved windvane.
Figure 4:
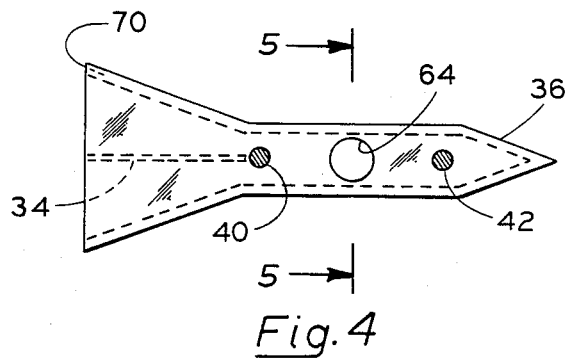
FIG. 4 is a bottom view of the windvane, as seen in the direction of lines 4—4 of FIG. 3, illustrating further structural details.
Figure 5:
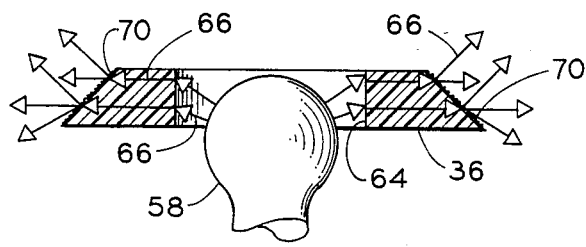
FIG. 5 is a cross-sectional view, on an enlarged scale, taken along lines 5—5 of FIG. 4 illustrating how reflected light is utilized to advantage to illuminate the within windvane.

The significant structural features for the improved windvane 30 hereof are illustrated in FIGS. 3-5, to which figures reference should now be made. As illustrated therein, the windvane 30 is provided with a flat body 36 preferably of plastic construction material, such as plexiglass, and thus has known light-transmitting properties. The significance of the light-transmitting properties of the plastic body 36 will soon be readily understood.

Appropriately disposed in an upright position at one end of the body 36 is a vane 34 which, in a well understood manner, offers resistance to any wind and thus results in the windvane 30 being urged into a position of rotation which points in the direction of the prevailing wind.

To allow the windvane 30 the degree of rotative movement that is required, body 36 is mounted by posts 40, 42 to a ring 44 which is appropriately affixed to the outer or rotating race 46 of a ball-bearing 48. The inner or stationary race 50 of ball-bearing 48 is part of a correspondingly stationary circular member 52 which is threadably engaged, as at 54, to a hollow, externally threaded bolt extension 56 of the upright support or sailboat mast 32. From the foregoing description it should be noted that member 52 is thus on the vertical axis of the mast 32. Even more important, since the mast vertical axis coincides with the rotation axis of the windvane 30, it thus follows that the stationary member 52 is also on the rotation axis of the windvane.

In the construction of the within windvane 30 it is therefore provided that the illumination source or light bulb 58, which it will be understood is appropriately electrically connected to be energized or illuminated by a source of electrical energy such as a battery or the like, is mounted in a socket 60 which is in turn appropriately connected in place on top of the stationary support 52. A central through bore 62 is advantageously used for the threading of electrical conductors or wiring from the battery to the light bulb 58 through the hollow bolt 56.

Completing the mounting for the source of illumination for the windvane 30 is the projection of the bulb 58 within an internal opening 64 of the body so that light rays, individually and collectively designated 66, are transmitted circumferentially from the light bulb 58 through the edge bounding the opening 64 of the plastic body 36 into said body, all as is clearly illustrated in FIG. 3.

With particular reference to FIGS. 4-5 it will now be explained how the light rays 66 transmitted from the light source 58 into the body material 36 are utilized to effectively provide enough illumination for the windvane 30 so that the pointing orientation thereof is readily visually perceived at night or under conditions of low visibility from an observer standing at a remote location, as in the sailboat hull 34. The windvane body 36 is provided with a light-releasing beveled edge 70 machined about the periphery of its arrow-shape. As understood, the machining which results in the bevel imparts scratches, akin to etched markings in the plexiglass, and contributes to providing a preferred location from which the light rays are released or exit from the plexiglass material. As a result, the edge 70 which, as already noted, follows the peripheral arrow-shape of the body 36 is thus illuminated and therefore is readily visually perceived from a remote location below the windvane and thus indicates to the observer the direction of the wind providing the position of rotation to the windvane. The phenomenon of the edge 70 being illuminated by light is very similar to what occurs when plexiglass or other such plastic material is scratched or etched, and light impinging upon such material then illuminates the scratch or etched markings. As a result of the concentration of the light in the edge 70 and thereby causing the illumination thereof, an optimum minimum voltage battery is able to be used and nevertheless provides effective illumination of the windvane 30 for night-time use or use under diminished conditions of visibility.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A windvane adapted to be illuminated at night incident to indicating wind direction comprising, in combination, a sailboat mast, a battery-operated light mounted on top of said mast, a plastic light-transmitting windvane having an internal opening receiving said light therein mounted for rotation about said light, and light-releasing beveled edges provided about the peripheral edge of said windvane, whereby light rays impinging upon said windvane are released therefrom through said beveled edges to thereby illuminate said edges and provide a visual indication of the direction of the wind that is providing the position of rotation to said windvane.

2. An illuminated windvane as defined in claim 1 wherein the mounting of said windvane includes a ball-bearing of the type having a stationary inner race and a rotatable outer race, said light being mounted on said stationary inner race and said windvane being mounted on said rotatable outer race.

* * * * *